J. P. IBSON.
CONCENTRATOR.
APPLICATION FILED OCT. 19, 1909.

981,194.

Patented Jan. 10, 1911.
2 SHEETS—SHEET 1.

Witnesses
Otto E. Hoddick.
I. D. Thornburgh.

Inventor
John P. Ibson.
By A. J. O'Brien.
Attorney

THE NORRIS PETERS CO., WASHINGTON, D. C.

J. P. IBSON.
CONCENTRATOR.
APPLICATION FILED OCT. 19, 1909.

981,194.

Patented Jan. 10, 1911.
2 SHEETS—SHEET 2.

Witnesses
Otto E. Haddick
I. D. Thornburgh

Inventor
John P. Ibson.
By A. J. O'Brien.
Attorney

UNITED STATES PATENT OFFICE.

JOHN P. IBSON, OF DENVER, COLORADO.

CONCENTRATOR.

981,194.

Specification of Letters Patent. Patented Jan. 10, 1911.

Application filed October 19, 1909. Serial No. 523,418.

*To all whom it may concern:*

Be it known that I, JOHN P. IBSON, residing in the city and county of Denver and State of Colorado, have invented certain new and useful Improvements in Concentrators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in apparatus for separating metals from their ores or other material with which they may be mingled.

It is more especially intended for treating material in a dry state, though its use is not limited thereto, as the crushed ore or placer dirt may be moist, damp or even wet and still be successfully treated by my improved machine.

To these ends the invention consists in the particular arrangement of a fan blower whose exhaust is extended into a serpentine or manifold conduit through which the material passes, said conduit being provided with pockets into which the particles of higher specific gravity are deposited.

It further consists in the features, arrangements and combinations hereinafter described and claimed, all of which will be fully understood by reference to the accompanying drawings, in which is illustrated an embodiment thereof.

Figure 1:
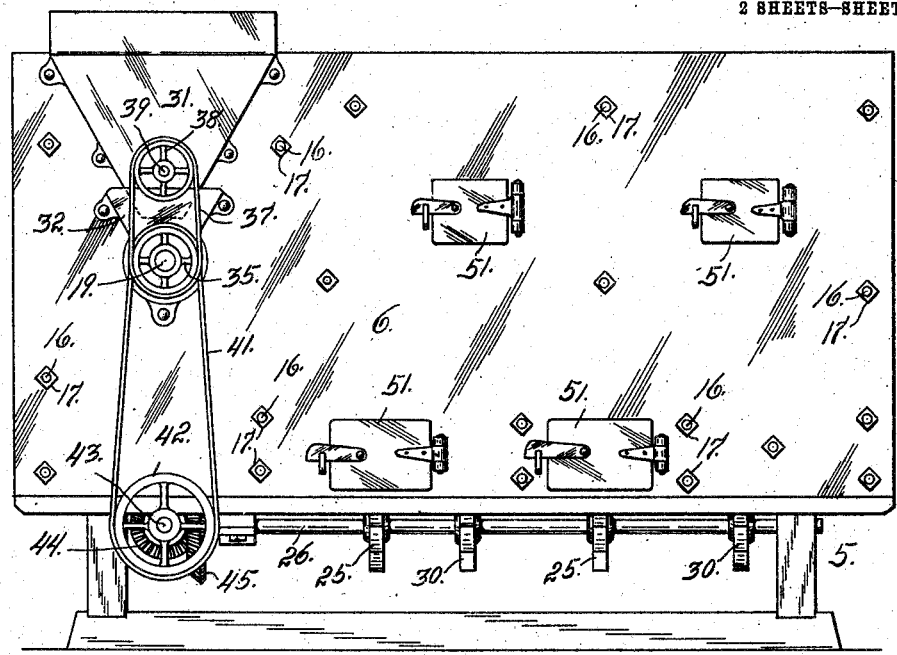
Figure 2:
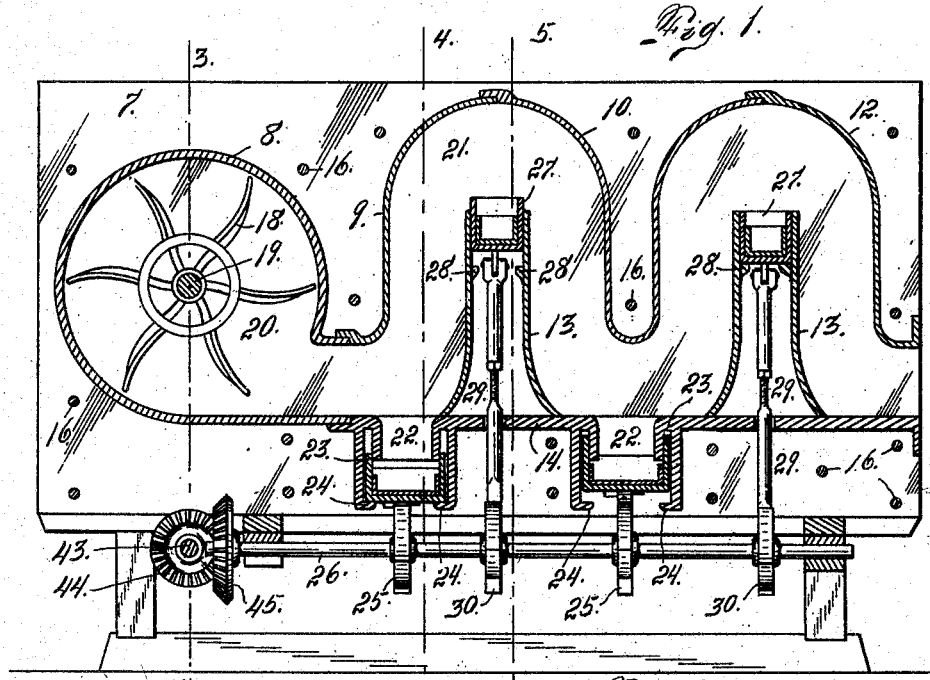
Figure 3:
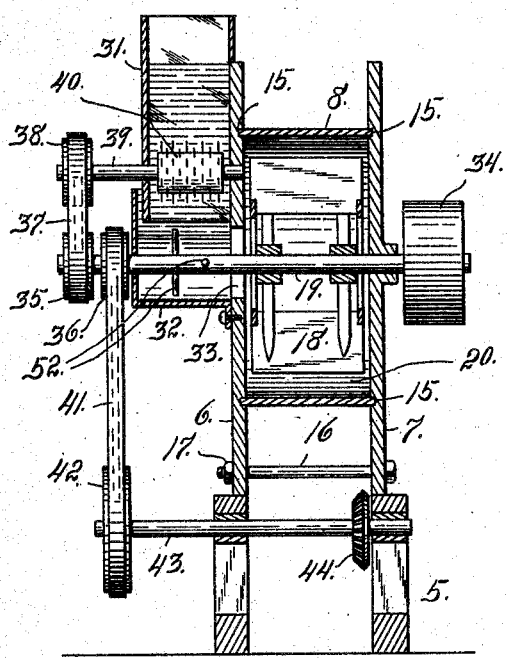
Figure 4:
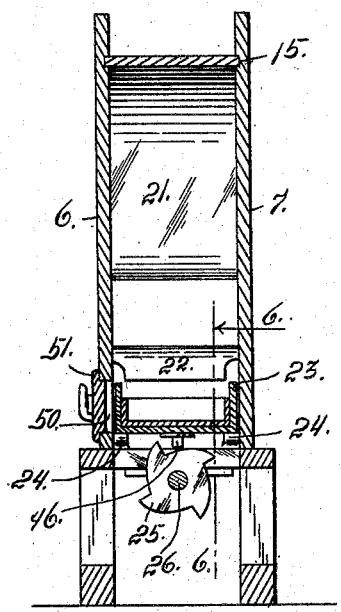
Figure 5:
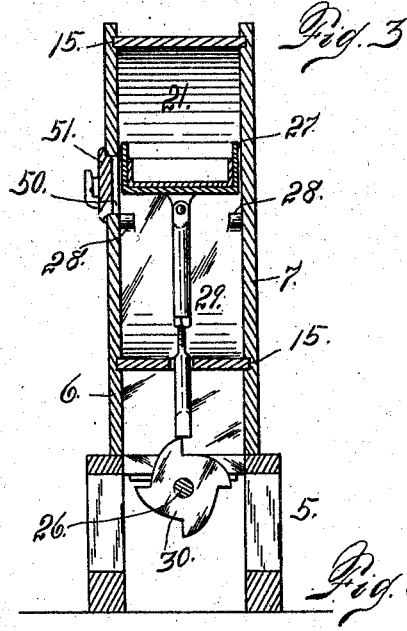
Figure 6:
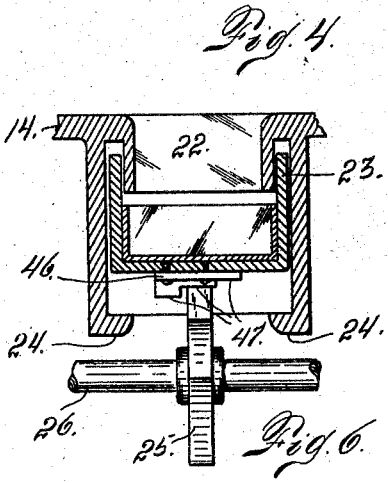

In the drawings, Figure 1 is a side elevation of my improved apparatus. Fig. 2 is a vertical, longitudinal section of the same. Fig. 3 is a detail, vertical cross section of the same taken on the line 3—3, Fig. 2. Fig. 4 is a similar section taken on the line 4—4, of Fig. 2. Fig. 5 is a similar section taken on the line 5—5, Fig. 2. Fig. 6 is a detail sectional view taken on the line 6—6, of Fig. 4.

Similar reference characters indicate corresponding parts in all the views of the drawings.

Let the numeral 5 designate a suitable frame work upon which the apparatus is mounted, 6 and 7 being the side walls of the apparatus. Arranged between these side walls are the suction fan and serpentine conduit, formed by the cylindrical member 8 and sectional parts 9, 10, 12, 13 and 14. The edges of the parts 8, 9, 10, 12, 13 and 14, are fitted in grooves 15, formed in the side wall, forming practically air tight joints when the walls 6 and 7 are secured together by the bolts 16 and nuts 17.

Fitted in the cylindrical member 8 is the fan wheel 18, mounted on the power shaft 19 and forming the blower chamber 20, which communicates with the serpentine conduit 21, formed of the parts 9, 10, 12, 13 and 14.

At the upper and lower bends of the serpentine conduit are arranged pockets, to receive the mineral deposits.

The pockets 22 at the lower bends of the conduit are formed in the part 14 in which are fitted mineral boxes 23, which rest normally on the shoulders 24. Directly beneath the boxes 23 are arranged the cam wheels 25 mounted on the shaft 26. These cam wheels when in operation impart a vertical reciprocating motion to the mineral boxes causing the heavier particles, or mineral values to settle to the bottom of the box. The pockets or mineral boxes 27 at the upper bends of the conduit are fitted in the parts 13 and rest on the lugs 28. Vertical, reciprocal motion is imparted to these pockets through the vertical rods 29 which are secured to the bottom of the pockets and have their lower ends resting in operative relation with the cam wheels 30, mounted on the shaft 26 with the cams 25. To one side of the apparatus, adjacent the blower chamber is secured the hopper 31, opening into a second hopper 32, the hopper 32 communicating with the blower chamber through the opening 33. (See Fig. 3.)

The main shaft 19, upon which the fan wheel is mounted, extends through the apparatus and has the pulley 34 secured to one end, and the pulleys 35 and 36, mounted at its opposite end for transmitting motion to the machine.

The pulley 35 is connected by the belt 37 to a pulley 38, mounted on the shaft 39, which is journaled in the hopper 31 and carries a toothed feed roller 40. The pulley 36 is connected by the belt 41 to a pulley 42, mounted on a shaft 43 journaled in the frame 5, and carrying the bevel gear 44, arranged to intermesh with the gear 45, mounted on the shaft 26, upon which the cams 25 and 30 are mounted.

The cams 25 are arranged to engage an adjustable block 46, provided with two or more levels 47; thus permitting the length of stroke to be varied by adjusting the position of the block 46.

The rods 29 communicating motion from the cams 30 to the pockets 27 are made of two sections: one threading into the other, thus permitting the rod to be adjusted to give any desired length of stroke within the limits of the cam wheels 30.

In the wall 6 of the apparatus are arranged openings 50 which register in line with the mineral boxes 23 and 27, when resting on their respective lugs, and are provided with doors 51, through which the contents of the boxes may be removed.

When desired trays containing mercury are placed in the boxes to facilitate the catching and saving of the fine mineral particles.

In operation, the crushed ore, or placer dirt is fed into the hopper 31, from which it is fed into the auxiliary hopper 32, by the toothed roller 40, by means of which the amount of feed may be regulated, and the clogging of the material prevented. As the ore passes into the second hopper, it is again separated by the fingers 52, secured in the shaft 19.

The suction induced by the fan 18 draws the material into the blower 20, and forces it out through the serpentine conduit 21. An air space between the two hoppers 31 and 32 insures a free supply of air to the blower at all times.

As the material comes in contact with the bends, the metallic values which are heavier fall into the pockets 22 and 27 out of the path of the air currents and are saved while the lighter gangue or waste material is carried along with the current and discharged at the terminus of the conduit.

The coarser mineral particles will be caught in the pocket nearest the fan, the finer particles in the next, and the finest in the last. This conduit may be extended so as to accommodate as many pockets as desired.

The vertical, reciprocating motion imparted to the boxes during the operation of the machine, causes the mineral values to seek the lowest possible position, whereby any gangue which finds its way into the boxes is kept on top and brought as near as possible into the path of the air currents, where it is skimmed off, so to speak, by the said air current.

Having thus described my invention what I claim is:

1. The combination of a casing provided with a fan blower and serpentine conduit, a hopper having a toothed drum, an auxiliary hopper having an air passage and communicating with said fan blower, pockets communicating with said conduit, mineral boxes fitted in said pockets, and cam wheels arranged to impart a vertical, reciprocating motion to the mineral boxes.

2. The combination of a casing provided with a fan blower and a vertically disposed serpentine conduit, a hopper communicating with the serpentine conduit, means for feeding material to be treated from the hopper to the serpentine conduit, pockets communicating with the serpentine conduit at the upper and lower bends thereof, mineral boxes fitted in the said pockets, and means for imparting a vertical, reciprocating movement to the mineral boxes, substantially as described.

In testimony whereof I affix my signature in presence of two witnesses.

JOHN P. IBSON.

Witnesses:
A. J. O'BRIEN,
JESSIE F. HOBART.